March 3, 1936.  K. L. HERRMANN  2,033,074
ANTIFRICTION BEARING
Filed Nov. 30, 1934
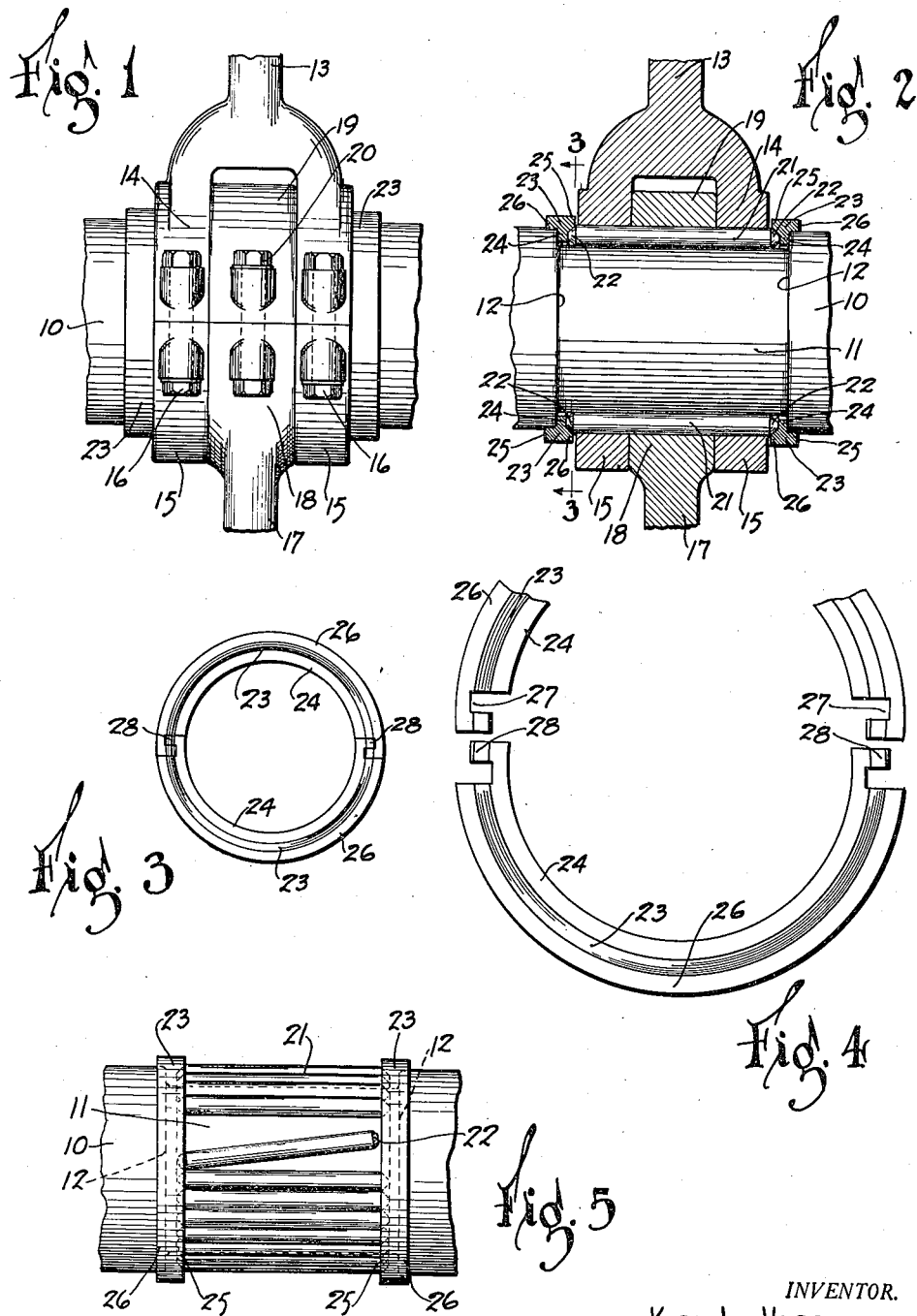
INVENTOR.
KARL L. HERRMANN
BY
ATTORNEY.

Patented Mar. 3, 1936

2,033,074

UNITED STATES PATENT OFFICE 2,033,074

ANTIFRICTION BEARING

Karl L. Herrmann, South Bend, Ind., assignor to The Bantam Ball Bearing Company, South Bend, Ind., a corporation of Indiana Application November 30, 1934, Serial No. 755,347

3 Claims. (Cl. 308—202)

This invention relates to roller bearings and particularly to such bearings interposed between a crankshaft and a pair of connecting rods mounted thereon.

A principal object is to provide a bearing comprising a single row of rollers interposed between a rotatable member, such as a crankshaft, and outer members, such as connecting rods, one of the latter being grooved at its bearing end and the other having a tongue fitting in the groove of the first outer member.

Another object is to provide a bearing comprising a single row of rollers interposed between the crankshaft and a plurality of connecting rods mounted thereon, and thrust rings interposed between the ends of the rollers and shoulders formed on the crankshaft.

A further object is to provide roller retainers formed in a plurality of sections abutting against the ends of the row of rollers and held in operative positions by tongues and grooves formed in the respective sections.

A further object is to provide retainers for a row of rollers encircling a rotatable member, such as a crankshaft, which are formed in a plurality of sections having mating tongues and grooves at the respective ends and having inwardly extending portions interposed between the ends of the rollers and a shoulder on the rotatable member, and another portion overlapping the said shoulders.

A still further object is to provide a retainer for a row of rollers encircling a rotatable member and having tapered ends, formed in a plurality of sections, each section having a portion interposed between the ends of the rollers and a shoulder on the rotatable member, another portion projecting inwardly over the tapered ends of the rollers and another portion overlapping the shoulder on the rotatable member, the respective sections being held in operative position by tongues and grooves formed therein.

Other objects, and objects relating to details of construction and methods of manufacture will be apparent from the detailed description to follow.

Referring to the drawing,

Fig. 1 is a fragmentary, side elevational view of a connecting rod including my invention incorporated therein.

Fig. 2 is a longitudinal, sectional view looking in the same direction as Fig. 1.

Fig. 3 is a sectional view taken on the line 3—3 of Fig. 2, showing one of the two-part roller retaining rings.

Fig. 4 is a view similar to Fig. 3, showing the retaining ring sections in separated position.

Fig. 5 is a side elevational view of the bearing shown in Fig. 2, illustrating the manner of assembling the rollers.

I am aware that heretofore others have formed connecting rods, one with a grooved end and the other with a tongued end, adapted to be nested around a crankshaft but in such constructions when it was desired to use roller bearings therein, it was the common practice to use separate rows of rollers for the tongued end of the one connecting rod and separate rows of rollers for the grooved end of the other rod. It has been found to be of considerable advantage to use a single row of rollers interposed between both connecting rods and the crankshaft and it has also been found desirable to use suitable thrust rings at the end of the rollers and I have, therefore, provided a construction which comprises the single row of rollers together with a suitable form of thrust rings therefor.

When the multiple rows of rollers are used as heretofore mentioned, each row of rollers will rotate around the crankshaft independently of the other row, while in the present construction the relative movement of the forked and tongued connecting rods has an opposing effect on the rotation and sliding of the rollers so that all of the rollers are subjected to an equal amount of wear and due to the rotation around the crankshaft, the thrust or heavy load is applied to the rollers in such a manner that no one roller or group of rollers is subjected to greater wear than the remaining rollers in the bearings.

Referring to the numbered parts of the drawing in which like numerals refer to like parts throughout the several views, I have shown a crankshaft 10 which is reduced to provide a bearing portion 11 having shoulders 12 at the ends thereof. A connecting rod 13 having a forked end 14 encircles one-half of the bearing portion 11 of the crankshaft 10 is held in position thereon by caps 15 secured to the forked end portions 14 by the bolts 16. A second connecting rod 17 has a tongued end 18 which is positioned between the forked ends 14 of the connecting rod 13 to encircle one-half of the bearing portion 11 of the crankshaft 10 and be held in position thereon by the cap 19 secured to the forked end 18 by the bolts 20. Interposed between the connecting rods 13 and 17 and the caps 15 and 19 therefor is a row of rollers 21 preferably having tapered ends 22.

Retaining rings for the rollers which also form thrust rings therefor are preferably made in a plurality of sections, as shown in Figs. 3 and 4, each section comprising a body portion 23, a thrust ring portion 24 interposed between the shoulder 12 on the crankshaft 10 and the tapered ends 22 of the rollers 21, an inwardly extending flange portion 25 overlapping the tapered ends 22 of the rollers 21, and an outwardly extending flange portion 26 overlapping the shoulder 12 on the crankshaft 10. One of the retaining ring sections 23 is provided with a groove 27 into which a tongue 28 of the other section 23 is adapted to fit so that the sections are joined together after the manner shown in Fig. 3.

In assembling the bearing, the retaining ring sections are preferably mounted on the bearing portion 11 of the crankshaft 10 and the tongue and groove portions 28 and 27 fitted in position, as shown in Fig. 3, after which the rollers 21 are slid in position between the respective retaining rings. The rollers are mounted therein in the manner shown in Fig. 5, the rollers preferably being sufficiently small in cross section so that the last roller may be sprung into position beneath the flanges 25 on the retaining ring section and whereby all the rollers will be retained in position therebetween.

It will thus be seen that I have provided a bearing assembly which is economical to manufacture as only one row of rollers is required instead of the plurality of rows of rollers as heretofore used and the roller retainer can be easily and economically machined to be assembled on the crankshaft. Also, the connecting rods and crankshaft may be of conventional design so that no special machining need be done on either of the connecting rods or crankshaft.

While I have shown a preferred embodiment of my invention, it will be understood to those skilled in the art that various changes may be made therein without departing from the spirit and substance of my invention, the scope of which is to be measured entirely by the subjoined claims.

What I claim is:

1. In combination with a rotatable member having shoulders formed thereon, a single full row of rollers encircling said member, and a multiple part retainer at each end of said rollers comprising, a portion interposed between the respective shoulder on said member and the ends of said rollers, a portion overlapping the ends of said rollers, and a portion overlapping the shouldered portions of said member.

2. In combination with a rotatable member having shoulders formed thereon, a single full row of rollers encircling said member, a multiple part outer race member for said rollers comprising, one member having a grooved and another member having a tongued end fitting into the grooved end of said one member, and a multiple part retainer at each end of said rollers comprising, a portion interposed between the respective shoulder on said member and the ends of said rollers, a portion overlapping the ends of said rollers, and a portion overlapping the shouldered portion of said member, said retainers permitting removal of said outer race member without disassembly of said rollers.

3. In combination with a rotatable member having shoulders formed thereon, a single full row of rollers having tapered ends encircling said member, a multiple part outer race member operable to cause said rollers to travel around said rotatable member to distribute the load on said rollers, and a multiple part retainer at each end of said rollers comprising, a portion interposed between the respective shoulder on said member and the ends of said rollers, a portion overlapping and engaging the tapered ends of said rollers, and a portion overlapping the shouldered portion of said rotatable member, said retainer permitting removal of said outer race member without disassembly of said rollers.

KARL L. HERRMANN.